United States Patent
Wu

(10) Patent No.: US 12,172,584 B2
(45) Date of Patent: Dec. 24, 2024

(54) CAR RADIATOR COVER

(71) Applicant: COPLUS INC., Tainan (TW)

(72) Inventor: Jacob Wu, Tainan (TW)

(73) Assignee: COPLUS INC., Tainan (TW)

( * ) Notice: Subject to any disclaimer, the term of this patent is extended or adjusted under 35 U.S.C. 154(b) by 287 days.

(21) Appl. No.: 17/874,099

(22) Filed: Jul. 26, 2022

(65) Prior Publication Data

US 2024/0034250 A1   Feb. 1, 2024

(51) Int. Cl.
| | |
|---|---|
| *B60R 13/00* | (2006.01) |
| *B60Q 1/26* | (2006.01) |
| *B60Q 1/28* | (2006.01) |
| *B60R 19/52* | (2006.01) |
| *G09F 13/04* | (2006.01) |

(52) U.S. Cl.
CPC .......... *B60R 13/005* (2013.01); *B60Q 1/2661* (2013.01); *B60R 19/52* (2013.01); *G09F 13/044* (2021.05); *B60R 2019/525* (2013.01)

(58) Field of Classification Search
CPC . B60R 13/005; B60R 19/52; B60R 2019/525; B60Q 1/2261; B60Q 1/2661; G09F 7/02; G09F 13/044
See application file for complete search history.

(56) References Cited

U.S. PATENT DOCUMENTS

| | | | | |
|---|---|---|---|---|
| 10,836,306 | B1* | 11/2020 | Dubey | G09F 13/044 |
| 2012/0256543 | A1* | 10/2012 | Marcove | B60Q 1/2696 |
| | | | | 362/540 |
| 2018/0154822 | A1* | 6/2018 | Salter | B60Q 1/444 |
| 2020/0130621 | A1* | 4/2020 | Gauci | B62D 25/12 |
| 2021/0284059 | A1* | 9/2021 | Hartenstein | B60Q 1/34 |

FOREIGN PATENT DOCUMENTS

WO    WO-2005016698 A1 *  2/2005  ........... B60R 13/005

* cited by examiner

*Primary Examiner* — Daniel J Colilla
(74) *Attorney, Agent, or Firm* — CKC & Partners Co., LLC

(57) ABSTRACT

A car radiator cover includes a frame, an assembly plate, and plural detachable indicator lamps. The assembly plate is attached to the frame and is provided in a hollow area of the frame. The assembly plate includes installation troughs located on an assembling side thereof, and each installation trough is provided with a through-hole at the bottom thereof, and the through-hole connects the installation trough to the bottom side of the assembly plate. Each detachable indicator lamp includes a body, a light source and a cable. The body includes an illumination surface and a fixing surface, the light source is disposed on the illumination surface, and one end of the cable is electrically connected to the light source by the fixing surface. Each detachable indicator lamp is detachably installed in one of the installation troughs, and the other end of the cable passes through the through-hole.

9 Claims, 7 Drawing Sheets

CAR RADIATOR COVER

BACKGROUND

Technical Field

This disclosure relates to car parts, in particular to a car radiator cover.

Related Art

A car radiator cover is used to protect the car radiator. In addition, additional indicator lamps can be attached to car radiator cover to decorate the car or provide an indication function.

Generally, the aforementioned indicator lamps are made by the car manufacturer or the car radiator cover manufacturer after deciding on the text or the pattern to be presented. The presented text or pattern is usually the car brands, logos, or texts/patterns representing a specific vehicle model. The manufacturer may also set the desired text/pattern for a specific theme.

The aforementioned fixed text pattern is not necessarily preferred by the consumer/vehicle user. Even if the consumer/vehicle user can buy a car radiator cover with other texts/patterns from the market, these texts/patterns may not be preferred by the consumer/vehicle user.

Furthermore, for car radiator cover manufacturers, the same configurations but different texts/patterns represent different products. Car radiator cover manufacturers need to prepare inventory for different products to meet the market demand. However, the inventory incurs additional costs, and it is difficult to determine the amount of inventory needed for different products.

SUMMARY

In view of this, this disclosure discloses a car radiator cover that allows easy replacement of indicator lamps.

This disclosure discloses a car radiator cover adapted to be installed to a front end of a car. The car radiator cover includes a frame, an assembly plate, and plural detachable indicator lamps. The frame surrounds a hollow area. The assembly plate is attached to the frame and is provided in the hollow area accordingly. The assembly plate includes an assembling side and a bottom side. The assembly plate includes plural installation troughs located on an assembling side of the assembly plate, and each installation trough is provided with a through-hole at the bottom thereof, and the through-hole connects the installation trough to the bottom side of the assembly plate. Each detachable indicator lamp includes a body, a light source and a cable. The body includes an illumination surface and a fixing surface, the light source is disposed on the illumination surface, and one end of the cable is electrically connected to the light source by the fixing surface. Each detachable indicator lamp is detachably installed in one of the installation troughs, and the other end of the cable passes through the through-hole.

In at least one embodiment, each of the detachable indicator lamps further includes a connector disposed at the other end of the cable.

In at least one embodiment, the body includes a protruding portion, the protruding portion is located on the fixing surface and configured to be embedded into the through-hole, and the cable extends from the protruding portion.

In one or more embodiments, the assembly plate is disposed across the hollow area and partially covers the hollow area, and uncovered area of the hollow area is an air intake zone.

In one or more embodiments, the car radiator cover further includes a grille, disposed in the air intake zone.

In one or more embodiments, the frame includes a frame front surface and a frame rear surface, the assembling side corresponds to the frame front surface, and the bottom side corresponds to the frame rear surface.

In one or more embodiments, each of the installation troughs is provided with a first fixing member on the bottom of the installation trough, each of the detachable indicator lamps is provided with a second fixing member on the fixing surface, and the first fixing member and the second fixing member are configured to be combined with each other.

In at least one embodiment, each of the light sources is configured as a text or a symbol.

In at least one embodiment, the first fixing member and the second fixing member are a combination of a latch hole and a latch, or a combination of a screw hole and a screw.

In at least one embodiment, each of the detachable indicator lamps includes a plurality of light sources and a plurality of corresponding cables, and each of the installation troughs is provided with a plurality of through-holes on the bottom, and each of the cables is configured to pass through one of the through-holes.

Through the above combination, users can quickly replace the detachable indicator lamps and arrange their desired combination of texts/patterns, without being limited to the manufactured configuration of the car radiator cover. Similarly, manufacturers do not need to prepare inventories for different combinations of texts/patterns on the car radiator cover; the manufacturers only have to install the corresponding combination of texts/patterns according to the purchase order when the products are going to be shipped, so as to minimize inventories.

BRIEF DESCRIPTION OF THE DRAWINGS

The present invention will become more fully understood from the detailed description given herein below for illustration only, and thus not limitative of the present invention, wherein.

DETAILED DESCRIPTION

Figure 1:
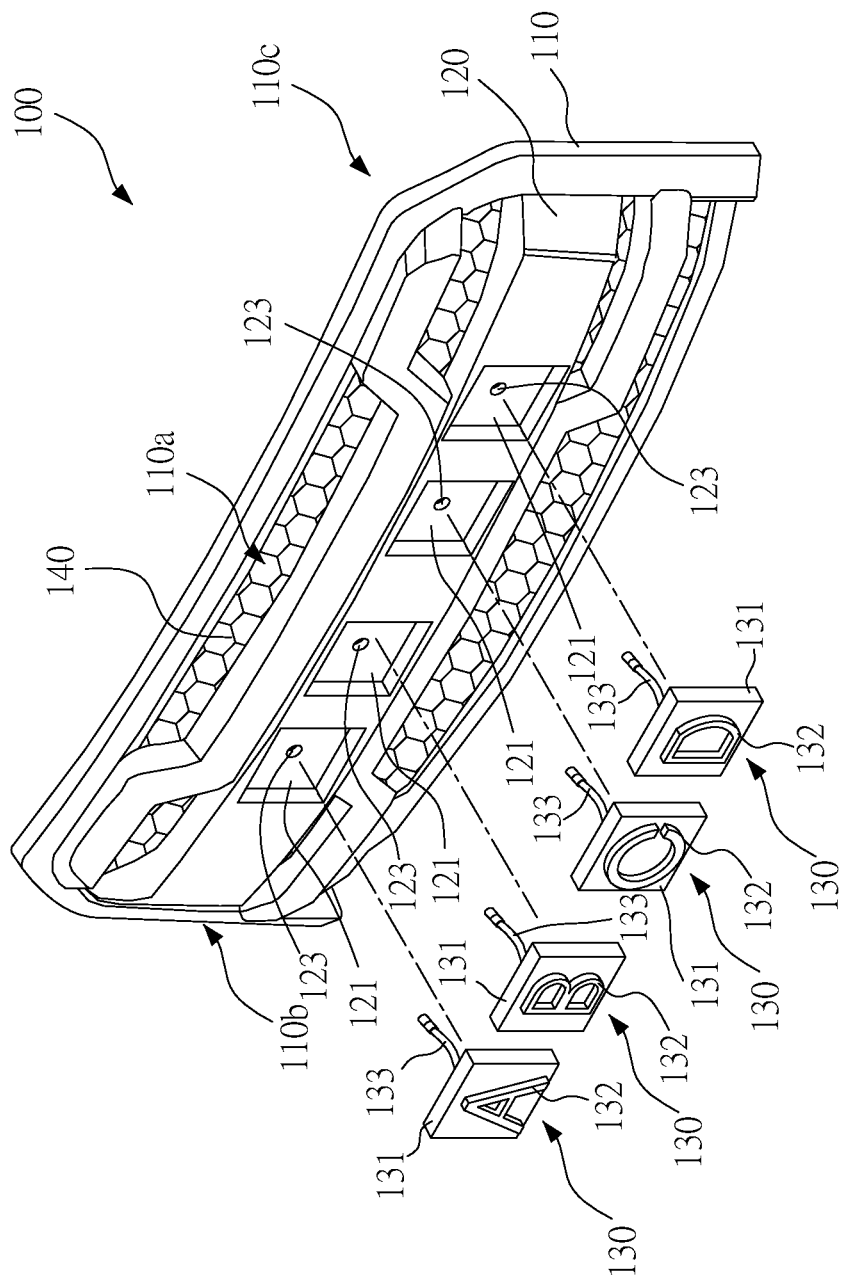
FIG. 1 is an exploded view of a car radiator cover according to an embodiment of this disclosure.
Figure 2:
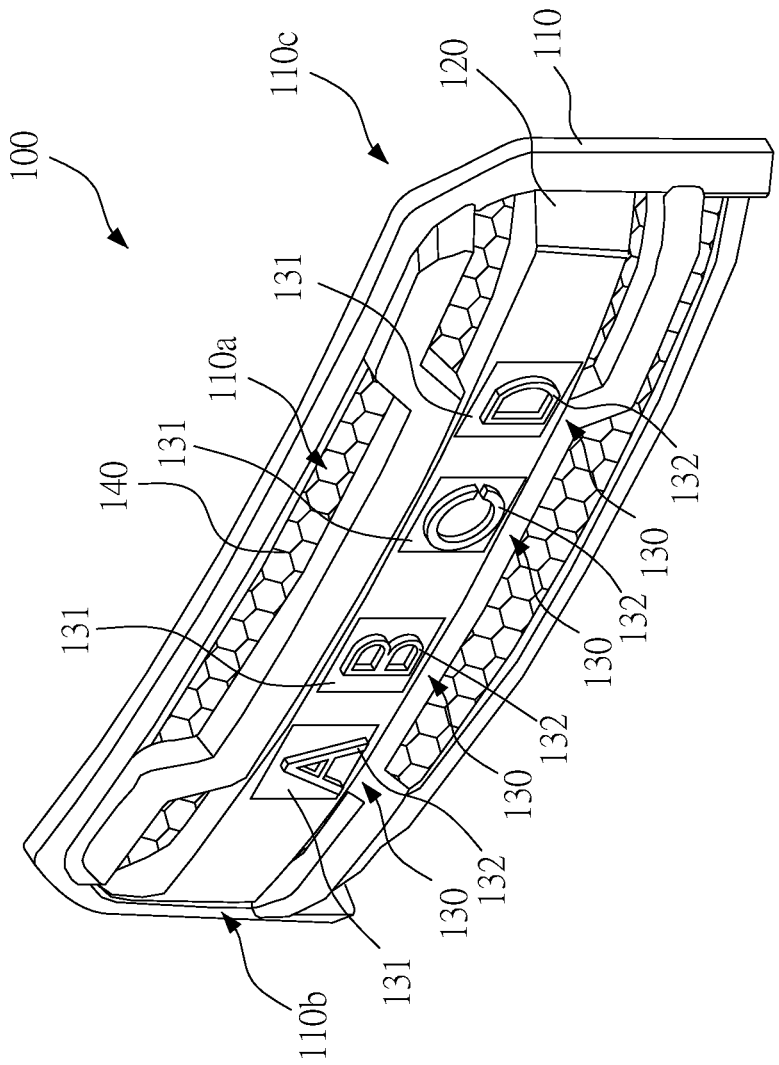
FIG. 2 is a perspective view of the car radiator cover according to the embodiment of this disclosure.

Please refer to FIG. 1 and FIG. 2, a car radiator cover 100 according to an embodiment of this disclosure is adapted to be installed to a front end of a car, so as cover the car cooling water tank and radiator.

As shown in FIG. 1, FIG. 2, FIG. 3 and FIG. 4, the car radiator cover 100 includes a frame 110, an assembly plate 120, and plural detachable indicator lamps 130. The frame 110 surrounds a hollow area 110a. The frame 110 includes a frame front surface 110b and a frame rear surface 110c.

As shown in FIG. 1, FIG. 2, FIG. 3 and FIG. 4, the assembly plate 120 is generally configured as a plate. The assembly plate 120 is attached to the frame 110 and assembly plate 120 is provided in the hollow area 110a accordingly. In an example, the assembly plate 120 is disposed across the hollow area 110a, such that the assembly plate 120 partially covers the hollow area 110a and divides the hollow area 110a into plural air intake zones. In a different example, the assembly plate 120 leans on the top edge or the bottom edge of the hollow area 110a, and uncovered portion of the hollow area 110a is the air intake zone. In one example, the frame 110 and the assembly plate 120 are two individual parts, and the assembly plate 120 is fixed to the frame 110 by screwing, welding, latch, etc. In another example, the frame 110 and the assembly plate 120 are integrally formed as a one-piece structure. Furthermore, the car radiator cover 100 further includes a grille 140. The grille 140 is disposed in the air intake zone to prevent foreign objects from crossing the air intake zone. The configuration and the mesh size of the cover 140 shown in the drawings is only an illustration and are not used to limit the configuration and the mesh size of the grille 140.

Figure 3:
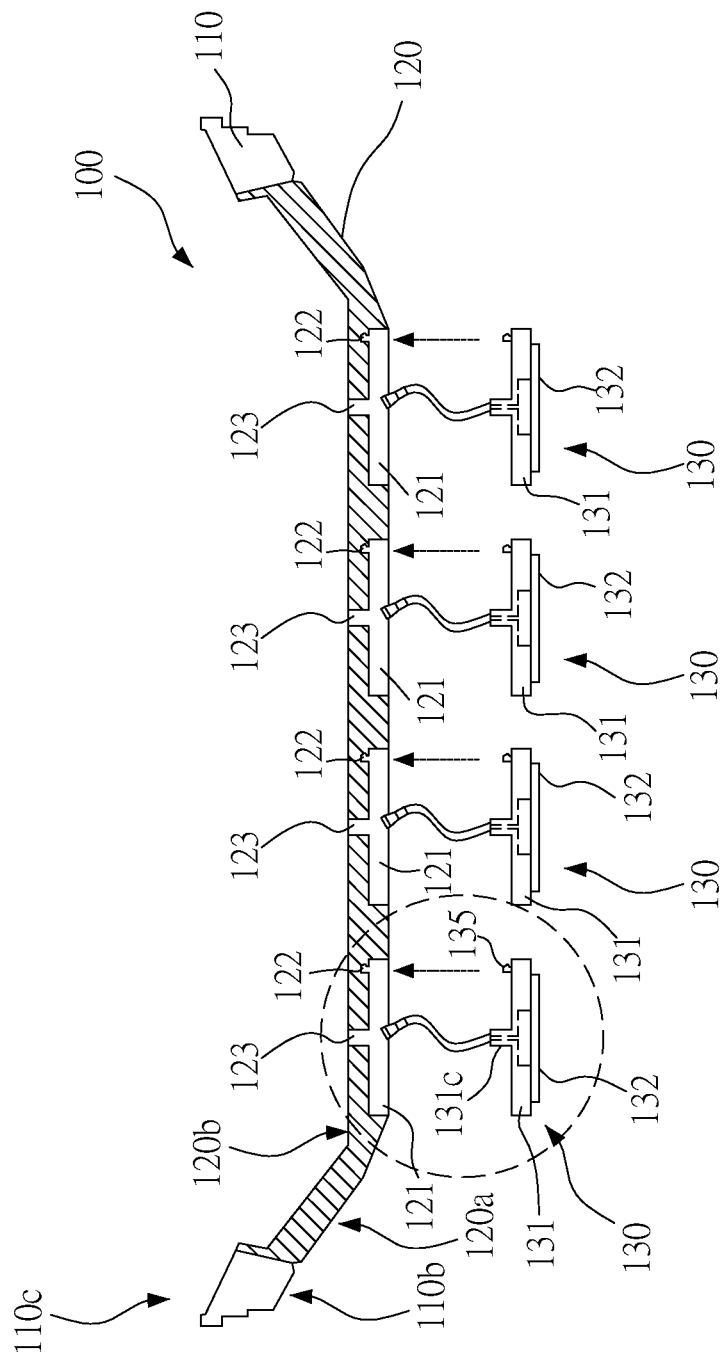
FIG. 3 is an exploded cross-sectional view of the car radiator cover according to the embodiment of this disclosure.
Figure 4:
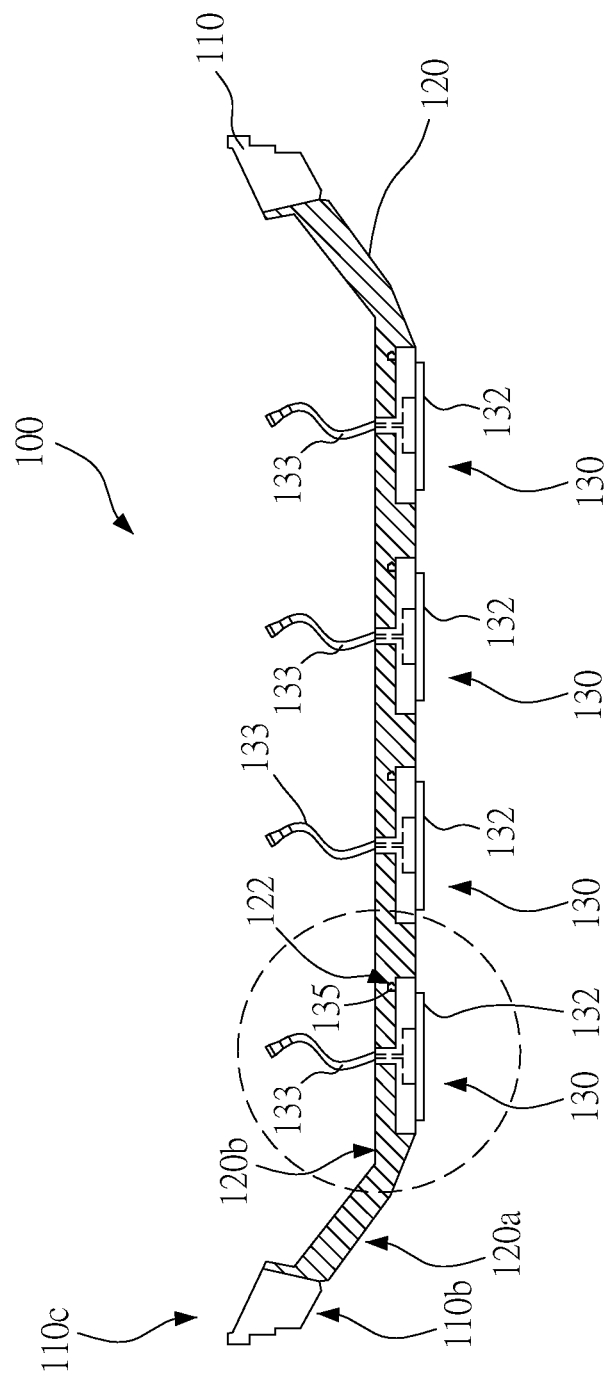
FIG. 4 is a cross-sectional view of the car radiator cover according to the embodiment of this disclosure.

As shown in FIG. 3 and FIG. 4, the assembly plate 120 includes an assembling side 120a and a bottom side 120b. The assembling side 120a corresponds to the frame front surface 110b, and the bottom side 120b corresponds to the frame rear surface 110c.

Figure 5:
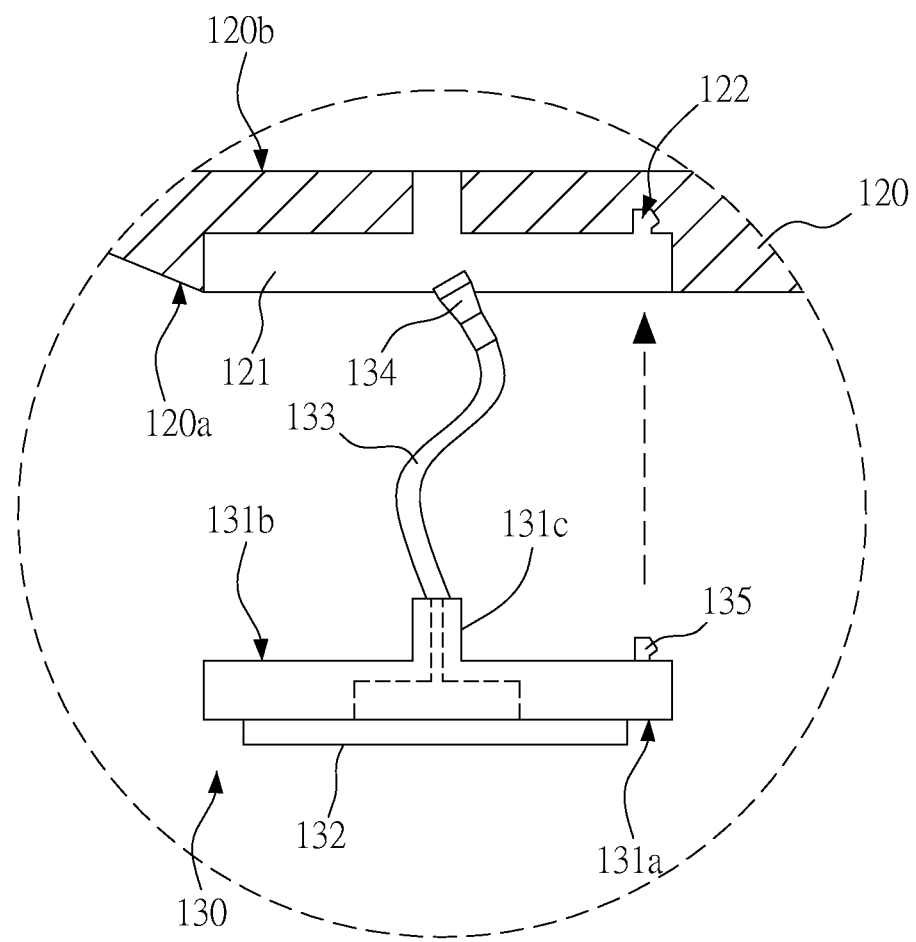
FIG. 5 is a partially enlarged view of FIG. 3.
Figure 6:
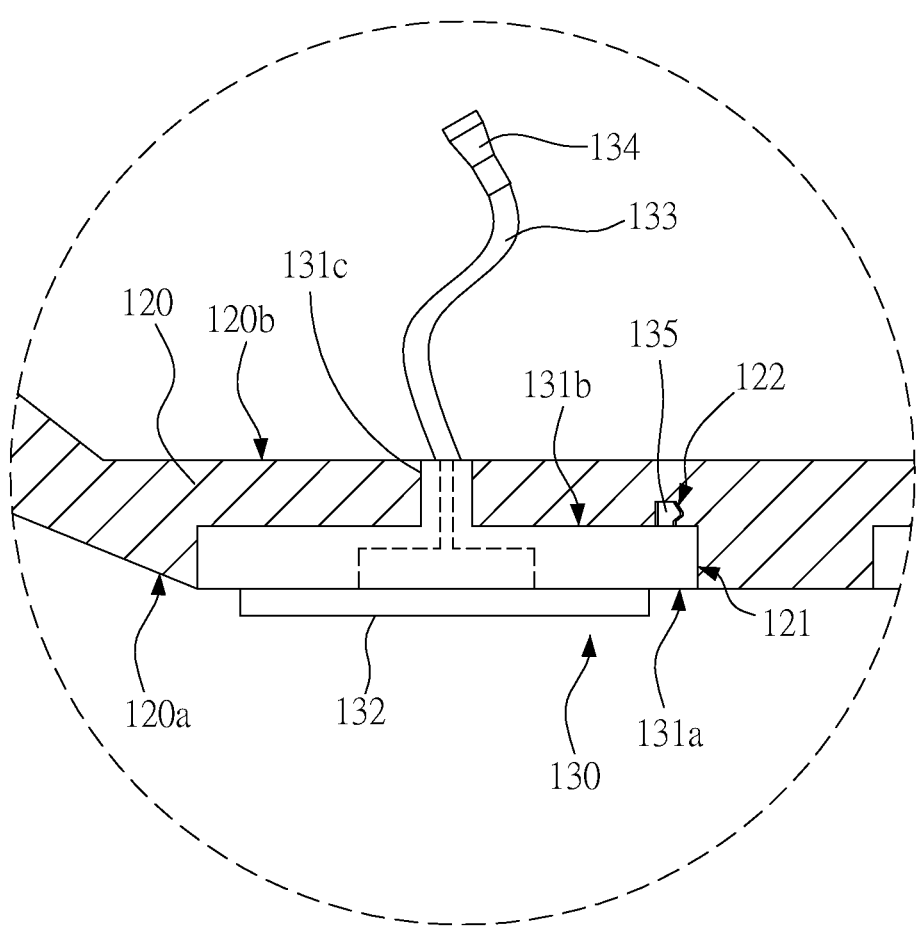
FIG. 6 is a partially enlarged view of FIG. 4.

As shown in FIGS. 5 and 6, the assembly plate 120 includes plural installation troughs 121, and the installation troughs 121 are located on the assembling side 120a. Each installation trough 121 is provided with a first fixing member 122 and a through-hole 123 on the bottom of the installation trough 121. The through-hole 123 connects the bottom of the installation trough 121 and the bottom side 120b of the assembly plate 120.

As shown in FIG. 3, FIG. 4, FIG. 5 and FIG. 6, each detachable indicator lamp 130 includes a body 131, a light source 132, and a cable 133. The body 131 includes an illumination surface 131a and a fixing surface 131b opposite each other. The light source 132 is disposed on the illumination surface 131a, and one end of the cable 133 is electrically connected to the light source 132 by the fixing surface 131b. The detachable indicator lamp 130 further includes a connector 134 disposed at the other end of the cable 133.

The light source 132 can be configured as a text/symbol, such as the texts of A, B, C and D shown in FIG. 1 and FIG. 2. Or the light source 132 can be configured with other forms of patterns, such as those used to identify special purpose motor vehicles.

As shown in FIG. 5 and FIG. 6, each of the detachable indicator lamps is provided with a second fixing member 135 on the fixing surface 131b, and the second fixing member 135 is paired with a first fixing member 122. The first fixing member 122 and the second fixing member 135 are a combination of a latch hole and a latch, or a combination of a screw hole and a screw.

As shown in FIG. 1 to FIG. 6, the detachable indicator lamp 130 is detachably installed in one of the installation troughs 121 of the assembly plate 120, and the fixing surface 131b faces the bottom of the installation trough 121. Meanwhile, the other end of the cable 133 passes through the through-hole 123. At this time, the first fixing member 122 and the second fixing member 123 are combined with each other, so as to fix the detachable indicator lamps 130 into the installation trough 121. The other end of the cable 133 passes through the through-hole 123 and located at the rear side of the car radiator cover 100. When the car radiator cover 100 is installed to the car, the cable 133 can be directly connected to the power supply system of the car or indirectly connected to the power supply system through the electrical connector 134. For example, the cable 133 is connected to the lamp switching circuit of the car to receive power and transmit the power to the light source 132, so as to activate the light source 132 for indication lighting.

In addition, the body 131 includes a protruding portion 131c, and the cable extends from the protruding portion 131c. The protruding portion 131c is configured to be embedded into the through-hole 123, so as to positioning and fixing the detachable indicator lamp 130. In one embodiment, the protruding portion 131c is monolithically formed on the body 131. In other embodiment, the protruding portion 131c is be formed by glue filled into the through-hole 123.

Figure 7:
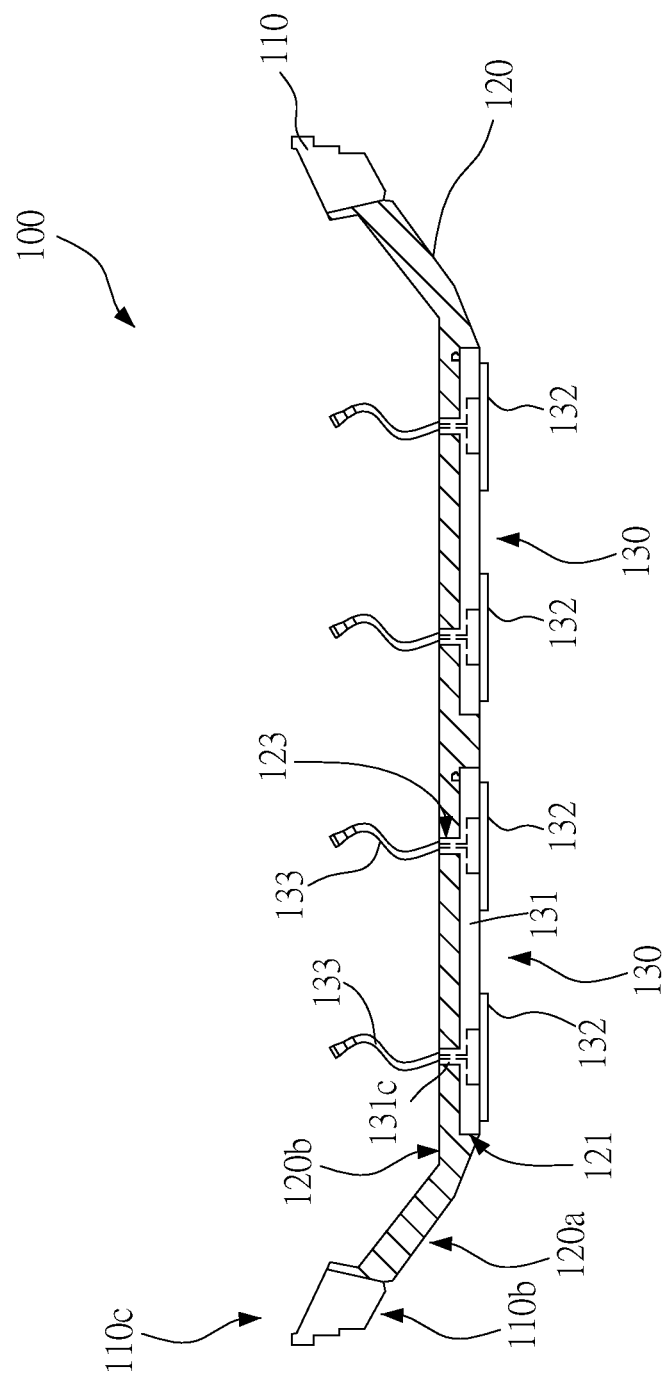
FIG. 7 is a cross-sectional view of the car radiator cover according to another embodiment of this disclosure.

Moreover, as shown in FIG. 7, each of the detachable indicator lamps 130 can be provided with plural light sources 132 and plural corresponding cables 133. Each of the installation troughs 121 is provided with plural through-holes 123 on the bottom thereof, and each of the through-holes 123 is provided for one of the cables 133 to pass through. In this way, the user can detach and replace plural light sources 132 at once. In one embodiment, a large sized through-hole 123 is provided, and such a large sized through-hole 123 is configured for plural cables 133 to pass through together.

In different embodiments, the first fixing member 122 and the second fixing member 135 are omitted, and a tight-fitting combination is used between the detachable indicator lamp 130 and the installation 121. Moreover, the combination of the protruding portion 131c and the through-hole 123 also provides the fixing effect, or the first fixing member 122 and the second fixing member 135 can be respectively disposed to the protruding portion 131c and the through-hole 123. For example, a latch as the first fixing member 122 is disposed on the protruding portion 131c and a latch hole as the second fixing member 135 is disposed on an inner wall of the through-hole 123, so as to integrate the first fixing member 122 and the second fixing member 135 to the protruding portion 131c and the through-hole 123. Through the above combination, the detachable indicator lamps 130 can be detached and altered, to replace the user's desired texts or patterns. For example, the original texts A, B, C, D can be replaced by new texts E, F, G, H, or other patterns. Moreover, the projection area of the light source 132 on the assembling side 120a is not necessarily smaller than the illumination surface 131a. The illuminated surface 131a may be arranged to slightly protrude on the frame front surface 110b, such that the light source 132 can extend beyond the illuminated surface 131a.

Through the above combination, users can quickly replace the detachable indicator lamps 130 and arrange their desired combination of texts/patterns, without being limited to the manufactured configuration of the car radiator cover 100. Similarly, the manufacturers do not need to prepare inventories for different combinations of texts/patterns on the car radiator cover, the manufacturers only have to install the corresponding combination of texts/patterns according to the purchase order when the products are going to be shipped, so as to minimize inventories.

What is claimed is:

1. A car radiator cover adapted to be installed to a front end of a car, comprising:

a frame, surrounding a hollow area;
an assembly plate, attached to the frame and provided in the hollow area accordingly;
wherein the assembly plate includes an assembling side and a bottom side, the assembly plate includes a plurality of installation troughs located on the assembling side, each of the installation troughs is provided with a through-hole at a bottom of the installation trough, and each of the through-holes connects a respective installation trough to the bottom side of the assembly plate;
a plurality of detachable indicator lamps, respectively including a body, a light source and a cable; wherein the body includes an illumination surface and a fixing surface, the light source is disposed on the illumination surface, and one end of the cable is electrically connected to the light source by the fixing surface;
wherein each of the detachable indicator lamps is detachably installed in one of the installation troughs, and the other end of the cable passes through the through-hole; and
wherein each of the installation troughs is provided with a first fixing member on the bottom of the installation trough, each of the detachable indicator lamps is provided with a second fixing member on the fixing surface, and the first fixing member and the second fixing member are configured to be combined with each other.

2. The car radiator cover as claimed in claim 1, wherein each of the detachable indicator lamps further includes a connector disposed at the other end of the cable.

3. The car radiator cover as claimed in claim 1, wherein the body includes a protruding portion, the protruding portion is located on the fixing surface and configured to be embedded into the through-hole, and the cable extends from the protruding portion.

4. The car radiator cover as claimed in claim 1, wherein the assembly plate is disposed across the hollow area and partially covers the hollow area, and an uncovered area of the hollow area is an air intake zone.

5. The car radiator cover as claimed in claim 4, comprising a grille, disposed in the air intake zone.

6. The car radiator cover as claimed in claim 1, wherein the frame includes a frame front surface and a frame rear surface, the assembling side corresponds to the frame front surface, and the bottom side corresponds to the frame rear surface.

7. The car radiator cover as claimed in claim 1, wherein each of the light sources is configured as a text or a symbol.

8. The car radiator cover as claimed in claim 1, wherein the first fixing member and the second fixing member are a combination of a latch hole and a latch, or a combination of a screw hole and a screw.

9. The car radiator cover as claimed in claim 1, wherein each of the detachable indicator lamps includes a plurality of light sources and a plurality of corresponding cables, and each of the installation troughs is provided with a plurality of through-holes on the bottom, and each of the cables is configured to pass through one of the through-holes.

* * * * *